(12) United States Patent
Schubert et al.

(10) Patent No.: US 11,979,742 B2
(45) Date of Patent: May 7, 2024

(54) UNAUTHORIZED DEVICE RESOURCE DRAIN PREVENTION

(71) Applicant: FORD GLOBAL TECHNOLOGIES, LLC, Dearborn, MI (US)

(72) Inventors: Jochen Schubert, Royal Oak, MI (US); Fouad Bounefissa, Oakville (CA); Michael Andrew Simons, Redford, MI (US); Thomas Nelson, Plymouth, MI (US); Timothy Thivierge, Jr., Carleton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 405 days.

(21) Appl. No.: 17/237,298

(22) Filed: Apr. 22, 2021

(65) Prior Publication Data
US 2022/0345886 A1   Oct. 27, 2022

(51) Int. Cl.
*H04L 9/32* (2006.01)
*G06K 7/10* (2006.01)
(Continued)

(52) U.S. Cl.
CPC ...... *H04W 12/062* (2021.01); *G06K 7/10722* (2013.01); *G06K 7/1413* (2013.01); *G06K 19/06028* (2013.01); *H04L 9/3239* (2013.01); *H04L 9/3271* (2013.01); *H04L 2209/12* (2013.01); *H04L 2209/80* (2013.01); *H04L 2209/84* (2013.01)

(58) Field of Classification Search
CPC . H04L 9/3271; H04L 9/3239; H04L 2209/80; H04L 2209/84
See application file for complete search history.

(56) References Cited

U.S. PATENT DOCUMENTS 9,424,451 B2   8/2016   Kalhous et al.
9,853,969 B2   12/2017   Enke
(Continued)

OTHER PUBLICATIONS

Emad Hamadaq et al. Clone-Resistant Vehicular RKE by Deploying SUC, 2017, IEEE, pp. 221-225 (Year: 2017).*
(Continued)

*Primary Examiner* — Ellen Tran
(74) *Attorney, Agent, or Firm* — Joseph Zane; Brooks Kushman P.C.

(57) ABSTRACT

Detection and prevention of resource drain from unauthorized wireless device connections is provided. Responsive to receiving of a connection request from a connecting device, a pre-authentication message is sent to the connecting device, the pre-authentication message including a challenge value. A vehicle hash result is computed using a hash function taking the challenge value and the unique identifier of the vehicle as inputs. A device hash result is received from the connecting device. Responsive to a match of the vehicle hash result and the device hash result, additional hardware of the vehicle is activated to perform a secondary authentication of the connecting device. Responsive to a mismatch, authentication of the connecting device is rejected without activation of the additional hardware, thereby avoiding key-off load from the additional hardware in instances where pre-authentication of the connecting device fails.

19 Claims, 6 Drawing Sheets

(51) Int. Cl.
*G06K 7/14* (2006.01)
*G06K 19/06* (2006.01)
*H04W 12/062* (2021.01)

(56) References Cited

U.S. PATENT DOCUMENTS

| | | | | |
|---|---|---|---|---|
| 10,049,232 | B2 * | 8/2018 | Takada | G06F 21/64 |
| 10,412,581 | B2 | 9/2019 | Smyth et al. | |
| 2013/0204423 | A1 * | 8/2013 | Overman | G05B 15/02 |
| | | | | 700/117 |
| 2014/0057567 | A1 | 2/2014 | Desai et al. | |
| 2014/0114497 | A1 * | 4/2014 | Miyake | B60R 16/0231 |
| | | | | 701/1 |
| 2016/0110572 | A1 * | 4/2016 | Kalhous | H04W 4/40 |
| | | | | 340/10.1 |
| 2017/0060559 | A1 * | 3/2017 | Ye | G06F 8/65 |
| 2019/0166635 | A1 * | 5/2019 | McColgan | H04W 12/50 |

OTHER PUBLICATIONS

BLE v4.2: Creating Faster, More Secure, Power-Efficient Designs—Part 4, Electronic Design, Dec. 14, 2016.

* cited by examiner

UNAUTHORIZED DEVICE RESOURCE DRAIN PREVENTION

TECHNICAL FIELD

Aspects of the disclosure generally relate to the detection and prevention of resource drain from unauthorized wireless device connections.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry and passive start (PEPS) key fobs operate without a customer interaction with the fob buttons to provide a response to a challenge pulse train sent by the vehicle, where if a proper response is received by the vehicle then the door may be unlocked by a user grasping the door handle. Phone-as-a-Key (PaaK) systems allow users to utilize their phones to unlock a vehicle without requiring a key fob device. These systems may operate similar to a key fob, but with communication with the vehicle over technologies such as BLUETOOTH Low Energy (BLE) or ultra-wide band (UWB).

SUMMARY

In one or more illustrative examples, a system for detection and prevention of resource drain from unauthorized wireless device connections is provided. The system includes a memory configured to store a unique vehicle identifier. The system further includes a controller of a vehicle. Responsive to receipt of a connection request from a connecting device, the controller is programmed to send a pre-authentication message to the connecting device, the pre-authentication message including a challenge value. The controller is further programmed to compute a vehicle hash result using a hash function taking the challenge value and the unique identifier of the vehicle as inputs and receive a device hash result from the connecting device. Responsive to a match of the vehicle hash result and the device hash result, the controller is further programmed to activate additional hardware to perform a secondary authentication of the connecting device. Responsive to a mismatch of the vehicle hash result and the device hash result, the controller is further programmed to reject authentication of the connecting device without activation of the additional hardware, thereby avoiding key-off load from the additional hardware in instances where pre-authentication of the connecting device fails.

In one or more illustrative examples, a method for detection and prevention of resource drain from unauthorized wireless device connections is provided. Responsive to receiving a connection request to a vehicle from a connecting device, a pre-authentication message is sent to the connecting device, the pre-authentication message including a challenge value. A vehicle hash result is computed using a hash function taking the challenge value and the unique identifier of the vehicle as inputs. A device hash result is received from the connecting device. Responsive to a match of the vehicle hash result and the device hash result, additional hardware of the vehicle is activated to perform a secondary authentication of the connecting device. Responsive to a mismatch of the vehicle hash result and the device hash result, authentication of the connecting device is rejected without activation of the additional hardware, thereby avoiding key-off load from the additional hardware in instances where pre-authentication of the connecting device fails.

In one or more illustrative examples, a non-transitory computer-readable medium includes instructions for detection and prevention of resource drain from unauthorized wireless device connections that, when executed by a processor of a controller of a vehicle, cause the vehicle to perform operations including to obtain or pre-generate a unique vehicle identifier; store the unique vehicle identifier to a memory of the vehicle; prior to the connection request, providing the unique vehicle identifier for capture by a connecting device; responsive to receipt of a connection request from the connecting device, send a pre-authentication message to the connecting device, the pre-authentication message including a challenge value, the challenge value being different for each connection request; compute a vehicle hash result using a hash function taking the challenge value and the unique identifier of the vehicle as inputs; receive a device hash result from the connecting device, the device hash being computed by the connecting device also using the hash function taking the challenge value and the unique identifier of the vehicle as inputs; responsive to a match of the vehicle hash result and the device hash result, activate additional hardware to perform a secondary authentication of the connecting device; and responsive to a mismatch of the vehicle hash result and the device hash result, reject authentication of the connecting device without activation of the additional hardware, thereby avoiding key-off load from the additional hardware in instances where pre-authentication of the connecting device fails.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

For vehicle-based BLUETOOTH Low Energy (BLE) features (such as access), a vehicle may continuously advertise an unsecured service to nearby BLUETOOTH devices to support initial connection and setup from the devices. In some scenarios, this broadcast may be limited to a moment (e.g., the engine is running, an advertisement triggered by a customer using the vehicle human machine interface (HMI), etc.). However, momentary broadcast may not viable for all features. For instance, a phone-as-a-key system should allow for key delivery and/or setup while the vehicle is off and locked. While the vehicle continuously broadcasts these BLE advertisements, other nearby devices are able to scan for these advertisements and establish a BLUETOOTH connection.

To determine if a newly connected device is authorized to communicate with the vehicle, or if not and the connection is be terminated, the vehicle may request connecting devices to strongly authenticate themselves using pre-shared secret keys and a corresponding cryptographic challenge-response mechanism. Due to the operations involved with the authentication, such as encryption or signing with separate cryptographic hardware that must first be powered on and initialized and/or generating ephemeral data using a hardware random number generator, each attempt represents a processing and energy burden to the vehicle. Given the ease for rogue devices to establish BLUETOOTH connections with the vehicle, with each connection triggering a new set of authentication calculations, this can potentially result in significant battery drain risks for the vehicle that may leave the driver unable to access or operate the vehicle.

As explained in detail herein, a pre-authentication scheme may be used reduce resource usage for authentication events. By performing a low resource usage pre-authentication, a higher resource usage secondary authentication may be avoided for rogue devices unable to successfully complete the pre-authentication. Moreover, by performing the secondary authentication, security of the vehicle is maintained, while battery drain risks for the vehicle in performing authentications is reduced.

Figure 1:
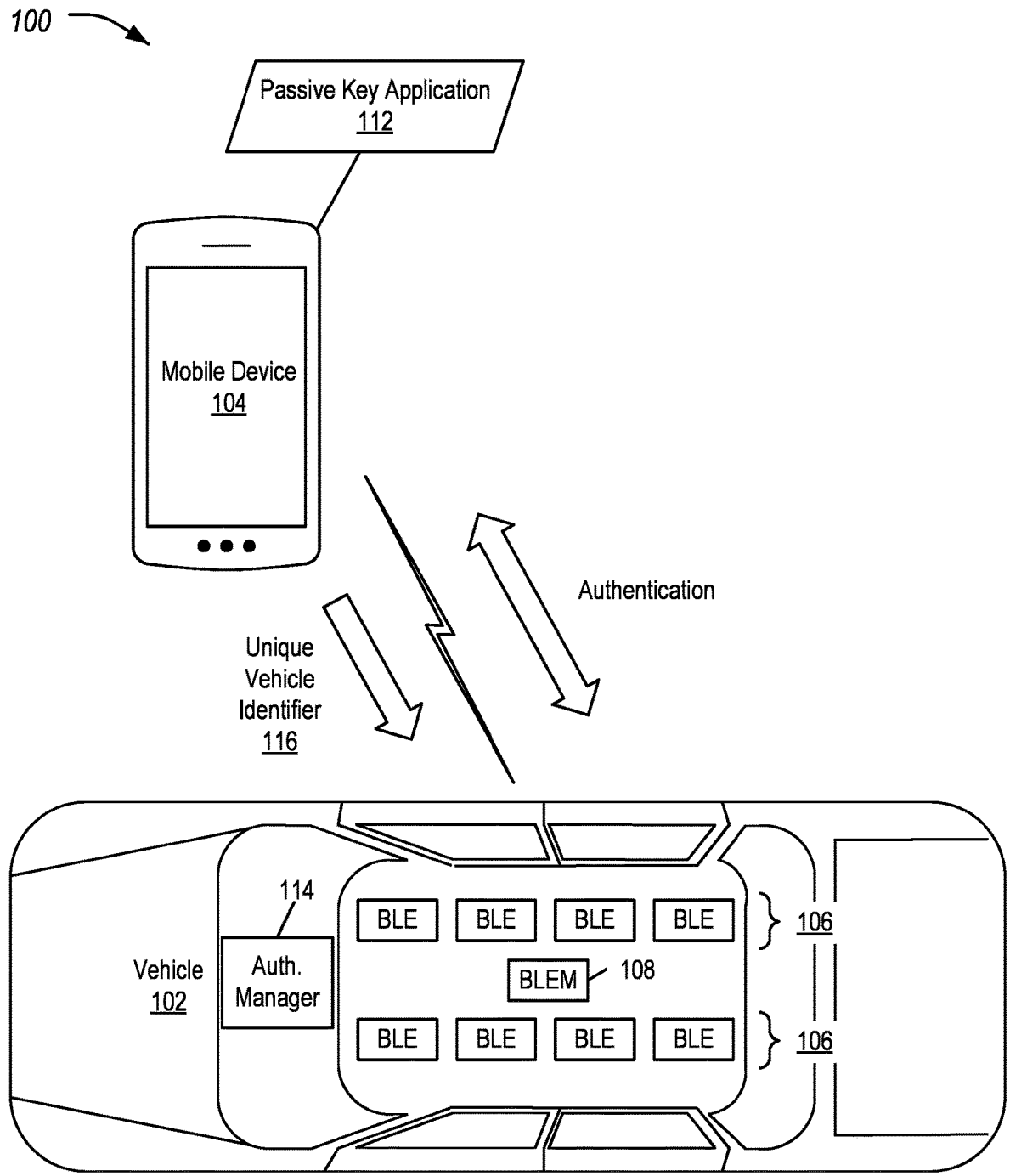
FIG. 1 illustrates an example system including a mobile device configured for communication with a vehicle for implementing a pre-authentication scheme for the detection and prevention of resource drain from unauthorized wireless device connections.

FIG. 1 illustrates an example system 100 including a mobile device 104 configured for implementing a pre-authentication scheme for the detection and prevention of resource drain from unauthorized wireless device connections. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained. The mobile device 104 may further include various wireless transceivers, such as a BLUETOOTH or BLE transceiver. BLUETOOTH and BLE technology both operate in the spectrum range of 2.4 to 2.4835 GHz. BLUETOOTH uses a layout of seventy-nine 1-MHz channels, while BLE uses has forty 2-MHz channels.

The vehicle 102 may include an array of BLE transceivers 106 configured to facilitate communication between the mobile device 104 and the vehicle 102. For instance, each BLE transceiver 106 may be connected to one or more antennas to form an array that may be used to triangulate or otherwise detect the location of the mobile device 104. The BLE transceivers 106 may be controlled by a BLE module (BLEM) 108 including a memory and a processor programmed to send and receive messaging between the mobile device 104 and the vehicle 102, e.g., to provide for the performance of challenge-response sequences and/or to receive commands from the vehicle 102. In an example, a key fob may connect to the closest-detected BLE transceiver 106 to communicate with the BLEM 108 of the vehicle 102. As shown the vehicle 102 includes eight BLE transceivers 106, but it should be noted that implementations may include more or fewer transceivers and/or antennas. It should be noted that while many examples herein relate to BLUETOOTH, this is only an example, and other wireless technologies such as UWB communication may be additionally or alternately be used.

The mobile device 104 may also include a display configured to provide a user interface to a user. In some examples, the display may be touch-sensitive, and may be further configured to receive input from the user. Additionally, a passive key application 112 may include instructions that, when executed by the one or more processors of the mobile device 104, cause the mobile device 104 to perform operations to facilitate access to the vehicle 102. In an example, the passive key application 112 may cause the mobile device 104 to display a user interface to the display including controls similar to those of a key fob, e.g., lock, unlock, start, etc. In another example, the passive key application 112 may cause the mobile device 104 to interact as a passive entry device with the vehicle 102, providing presence information to the BLEM 108 that allows the vehicle 102 to detect that an authorized user of the vehicle 102 is nearby. By executing the passive key application 112 to control communication of the mobile device 104 with the BLEM 108 of the vehicle 102, the mobile device 104 may be used to unlock, start, or otherwise access the vehicle 102.

The passive key application 112 may allow for the authentication of the mobile device 104 to the vehicle 102 using an authentication manager 114 of the vehicle 102. The authentication manager 114 may be a controller of the vehicle 102 that is in communication with the BLEM 108, as well as with other components of the vehicle 102, such as door locks or vehicle ignition interlock. The authentication of the mobile device 104 to vehicles 102 may utilize a PaaK feature implementation, ensuring a secure connection between the user mobile device 104 and a vehicle connectivity module (such as the BLEM 108), whereby the user position can be localized utilizing the BLE transceiver 106 antennas. For instance, the authentication manager 114 may confirm the location of the mobile device 104 as local to the vehicle 102, and/or may perform relay attack prevention according to ToF and/or the location determination of the mobile device 104.

The authentication manager 114 may further implement hardware features that may be utilized in performance of the authentication. For instance, the authentication manager 114 may include or access cryptographic hardware to provide for authentication support using pre-shared secret keys and a cryptographic challenge-response. In another example, the authentication manager 114 may include or access a hardware random number generator configured for use in the generation of ephemeral data. These additional hardware devices may involve substantial key-off load to the vehicle 102, but may be required in order to vet a connection request from the mobile device 104. Accordingly, to minimize the battery drain due to connection attempts from unauthorized devices, a low-power pre-authentication scheme may be implemented to reject rogue mobile devices 104 before such powered cryptographic authentication calculations are performed.

To implement the pre-authentication mechanism, the vehicle 102 may first generate or otherwise obtain a unique vehicle identifier 116 of sufficient length (e.g., in many examples of 128 bits or longer). This unique vehicle identifier 116 may also be shared (e.g., through a telematics network) or otherwise be made known to authorized mobile devices 104.

In one example, the vehicle 102 may share the unique vehicle identifier 116 with a server (not shown), such that the server may then provide the unique vehicle identifier 116 with authorized devices (such as the mobile device 104) via a communications network. For instance, the mobile device 104 may download the unique vehicle identifier 116 from the server using Wi-Fi, 4G LTE/5G, or other similar Internet connected networks.

In another example, the vehicle 102 may share the unique vehicle identifier 116 with the mobile device 104 using an alternate communications channel (also not shown), such as having the device scan a code (e.g., a single-dimension barcode, a QR code, etc.) in which the unique vehicle identifier 116 is embedded as data. This code may be displayed, as some examples, within the vehicle 102, on a website, on a sticker, etc. In yet a further example, the use may manually type the unique vehicle identifier 116 into the mobile device 104.

Regardless of approach, it is desirable for the unique vehicle identifier 116 not to be publicly available. Accordingly, the methods for a mobile device 104 or user to obtain the unique vehicle identifier 116 of the vehicle 102 should require authentication, such as starting the vehicle 102 with a valid key and/or activating a function within the HMI of the vehicle 102, logging into a website or mobile application with credentials for an account authorized to view the unique vehicle identifier 116 of the vehicle 102, obtained the identifier in a document during vehicle 102 purchase, lease, or vehicle 102 share, etc.

Figure 2:
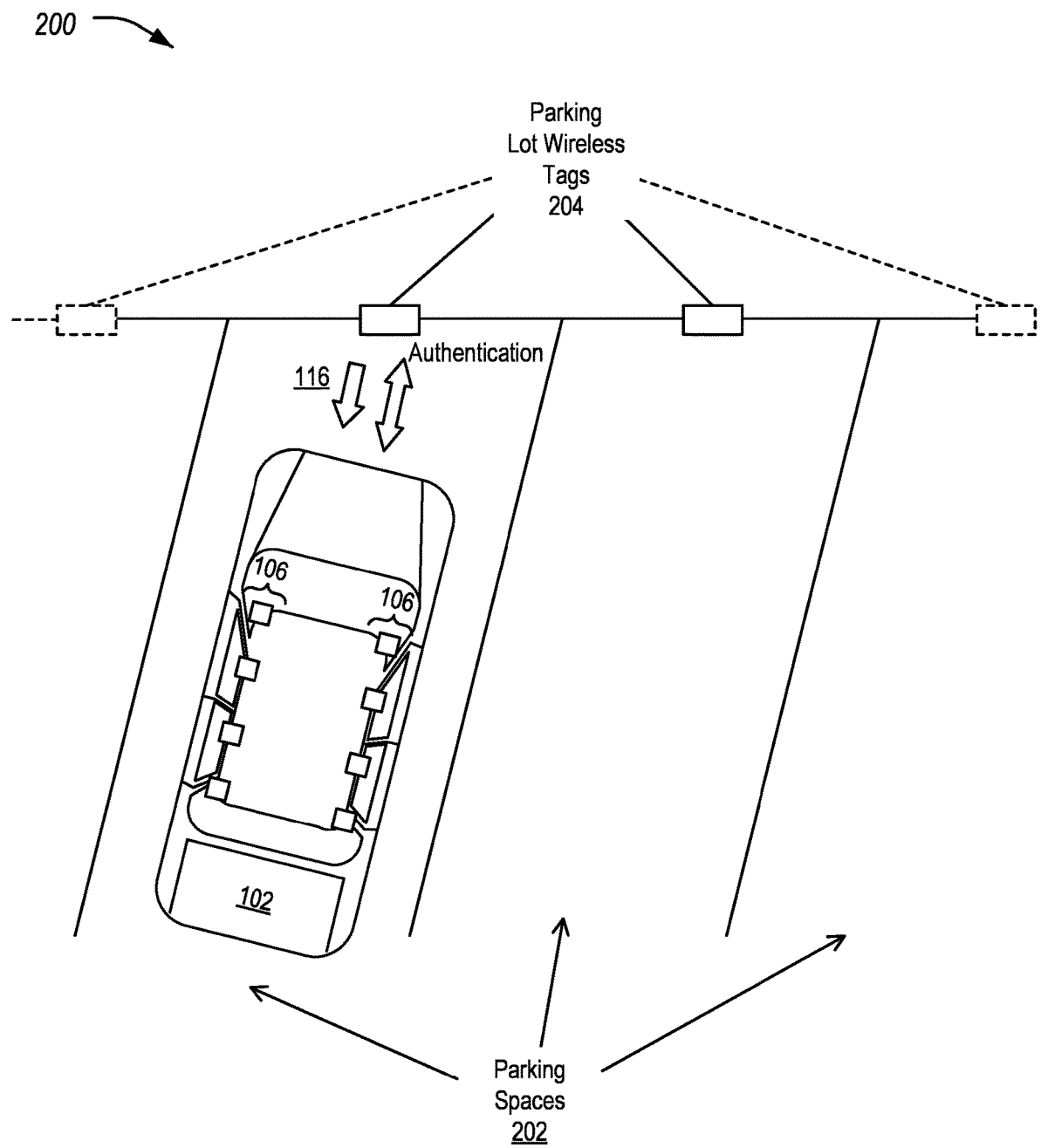
FIG. 2 illustrates an example parking scenario for use with the pre-authentication scheme.
Figure 3:
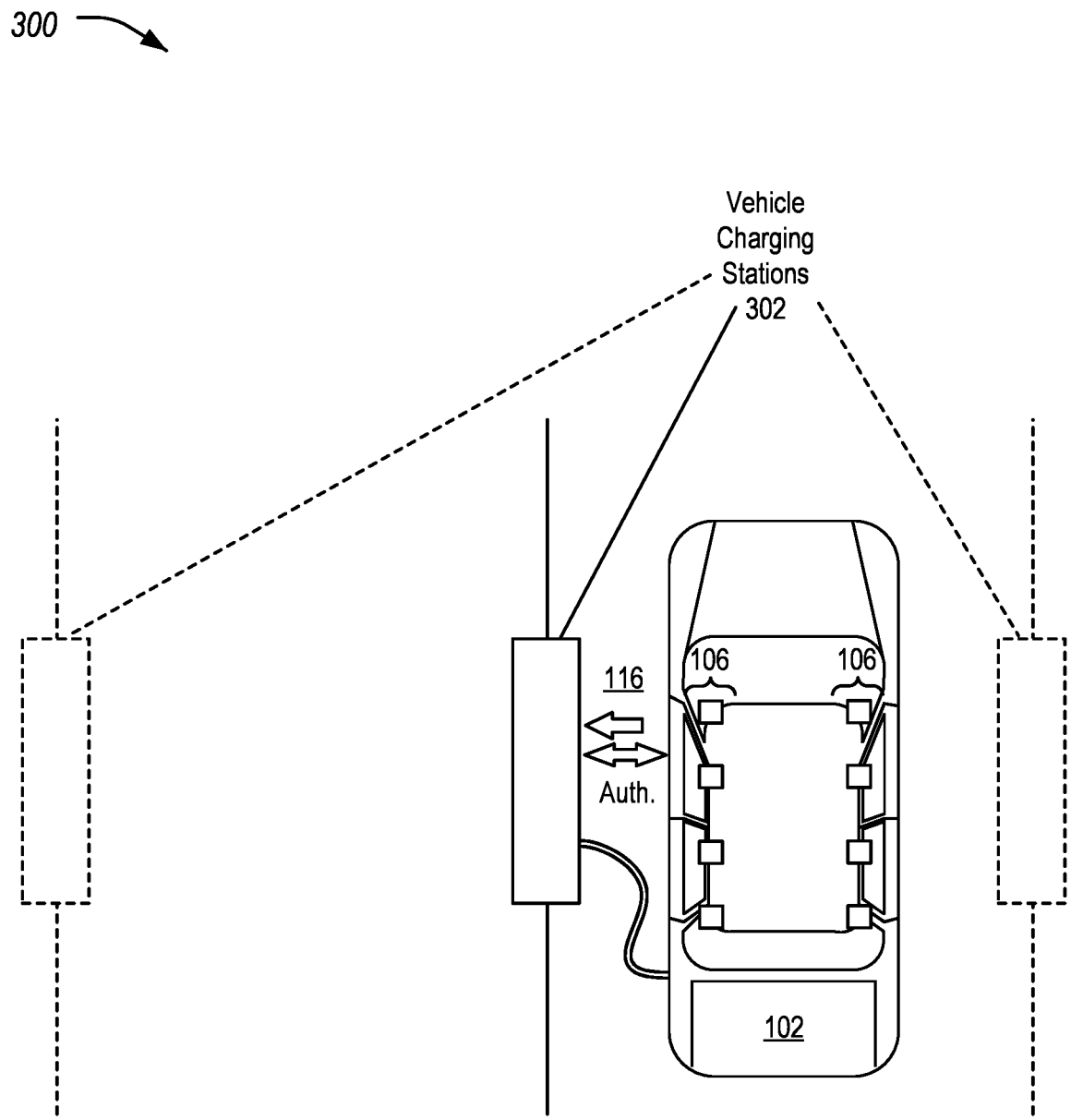
FIG. 3 illustrates an example charging scenario for use with the pre-authentication scheme.

It should be noted that the pre-authentication scheme may be useful in situations other than mobile device 104 access to the vehicle 102. FIG. 2 illustrates an example parking scenario 200 for use with the pre-authentication scheme. As shown, each parking space 202 may include a corresponding parking lot wireless tag 204 configured to connect to the vehicle 102 that is parked in the parking space 202. This may be done, for instance, to validate the correct vehicle 102 is parked, and or to determine the length of time that the vehicle 102 is parked in the parking space 202. As another possibility, FIG. 3 illustrates an example charging scenario 300 for use with the pre-authentication scheme. Here, the vehicle charging station 302 may be configured to connect to the vehicle 102 that is charging, for instance, to communicate account information, cost information, expected charge time, etc.

Figure 4:
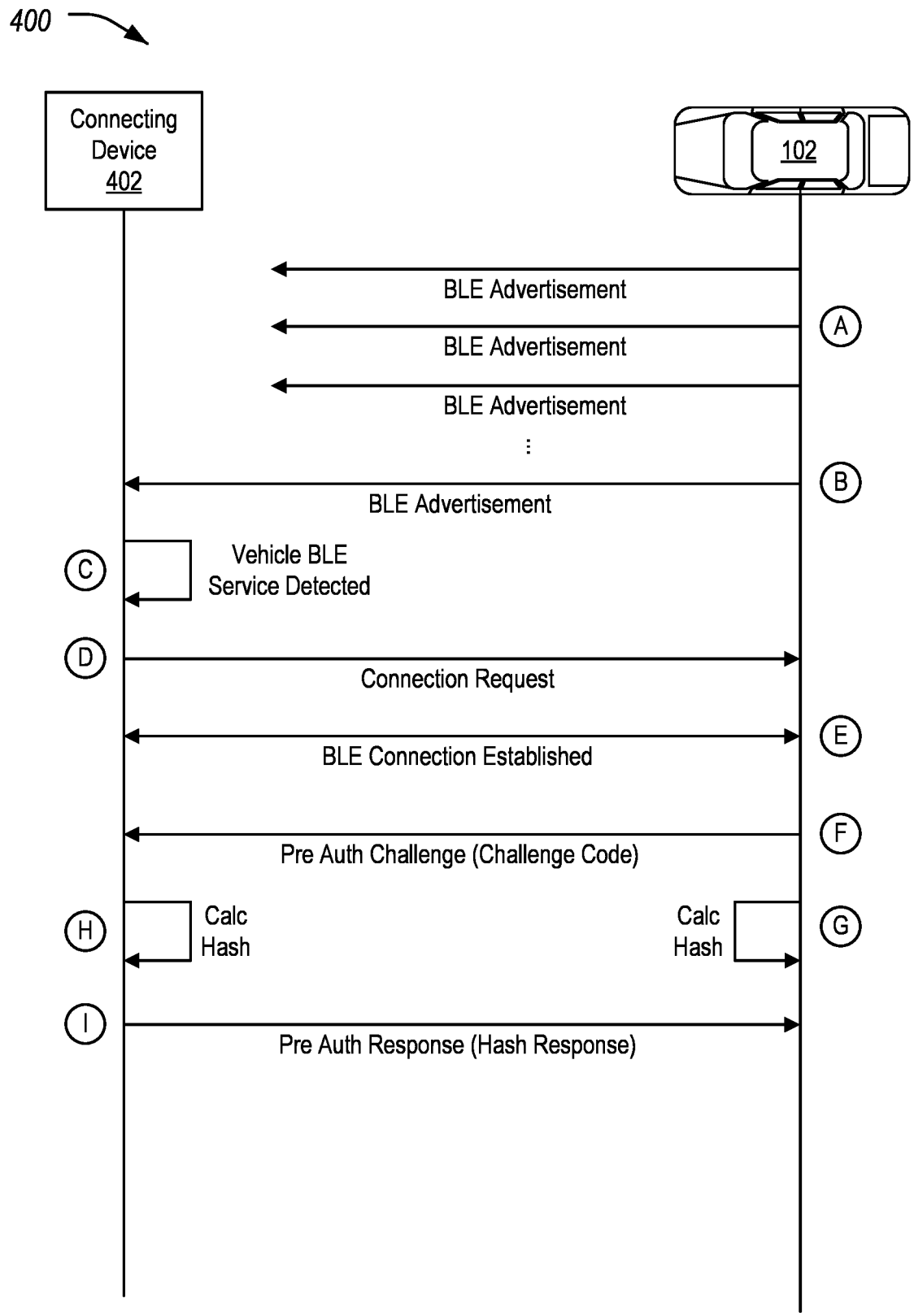
FIG. 4 illustrates a portion of a data flow diagram for the pre-authentication scheme for the detection and prevention of resource drain from unauthorized wireless device connections.
Figure 5:
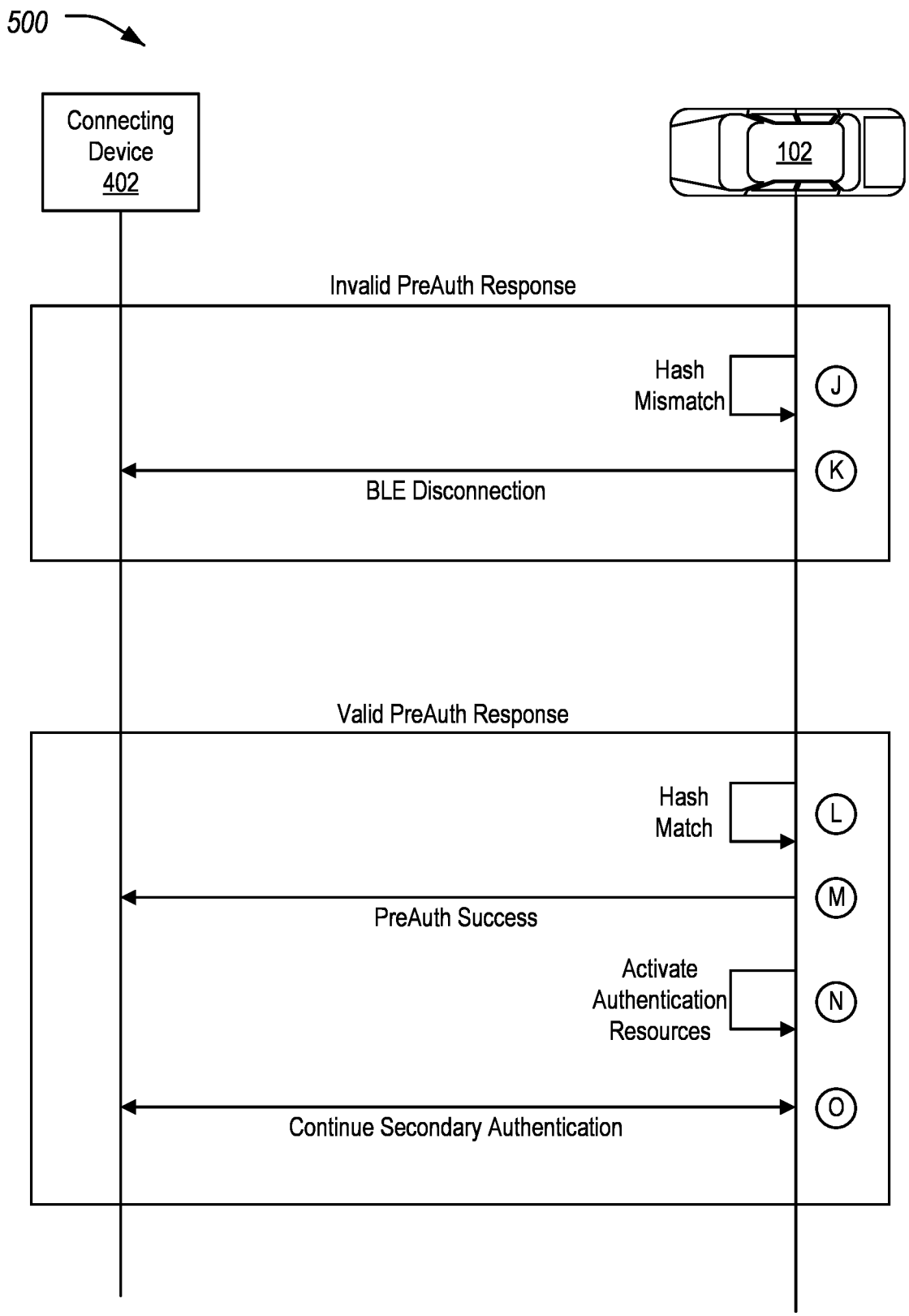
FIG. 5 illustrates a portion of a data flow diagram for the pre-authentication scheme for the detection and prevention of resource drain from unauthorized wireless device connections.

FIGS. 4 and 5 illustrates an example data flow diagram for pre-authentication scheme for the detection and prevention of resource drain from unauthorized wireless device connections. FIG. 4 illustrates an example portion 400 of the data flow diagram showing vehicle 102 advertising through pre-authentication response. The example portion 400 of the data flow diagram may be performed by a connecting device 402 (e.g., the mobile device 104, the parking lot wireless tags 204, the vehicle charging stations 302, etc.) and the vehicle 102 (e.g., on the vehicle 102 side by the BLEM 108, and/or authentication manager 114), in many cases following the creation and sharing of the unique identifier with authenticated connecting devices 402.

At index (A), the vehicle 102 broadcasts advertisements for a BLE service. This service may be an authentication service configured to provide access to the vehicle 102 for authenticated users or device locations that are validated according to their connecting devices 402. In a BLUETOOTH example, the vehicle 102 may operate as the BLE peripheral device in advertising mode, such that advertising packets are periodically sent. In an example, the time interval between the packets may have a fixed interval along with a random delay to address possible contention issues. At index (B), one of the broadcast advertisements is received by the connecting device 402.

At index (C), the connecting device 402 identifies that the BLE service is the authentication service for the vehicle 102. For instance, the advertisements from the vehicle 102 may include one or more universal unique identifiers (UUIDs) of services provided by the vehicle 102. These UUIDs may include, for instance, a UUID of an access service to the vehicle 102. The connecting device 402 may monitor the advertisements for the identifier of the access service, and if the identifier is found, the connecting device 402 may attempt to connect to the vehicle 102. This is shown at index (D), at which the connecting device 402 makes a connection request to the vehicle 102. This BLE connection is established by the vehicle 102, as shown at index (E). It should be noted that authentication is only an example, and the service may be another type of service as well, such as a fleet management service, a vehicle 102 booking service, etc.

At index (F), the vehicle 102 initiates a pre-authentication challenge with the connecting device 402. This may involve the vehicle 102 generating a challenge value. For instance, the vehicle 102 may generate or otherwise obtain a pseudo or truly random challenge value of a sufficient length (e.g., 64 bits or longer). In some examples, to improve system performance, the vehicle 102 may maintain a pool of entropy to ensure random challenge values can readily be made available or to optimize current random value consumption. In an alternate implementation, the challenge value may be a counter that is incremented for each attempted connection. Regardless of approach, the challenge value is sent to the connecting device 402 via the connection, such that the connecting device 402 thereby obtains the challenge value.

At index (G) the vehicle 102 calculates a pre-authentication response at the vehicle 102 side. At index (H) the connecting device 402 similarly performs the same calculation but by the connecting device 402. These independent computations by the vehicle 102 and connecting device 402 may be performed as follows:

PreAuthenticationResponse=Hash(PreAuthentication-
_Challenge||Vehicle_Identifier), where:

PreAuthenticationChallenge is the challenge value sent to the connecting device 402;

Vehicle_Identifier is the unique vehicle identifier 116 that has been pre-shared with authorized connecting device 402;

|| is an operator representing concatenation;

Hash is a one-way cryptographic function (e.g., MD5, SHA, Whirlpool, BLAKE, etc.); and PreAuthenticationResponse is the resulting hash of the function.

At index (I), the connecting device 402, having calculated the device-side hash, transmits the connecting device 402 response value back to the vehicle 102 via the connection. It should be noted that this is only an example, and variations on the computation of the response may be made. For instance, other combining mechanism may be used instead of the || operator. As another possibility, additional or different information such as date, time, user identifier, etc., may also be incorporated into the value to be hashed. In another example, the device-side hash may be truncated, compressed, or otherwise further manipulated prior to transmitting to the vehicle 102.

While the hash function may be widely available, the unique vehicle identifier 116 is generally not publicly known. Thus, only connecting devices 402 with knowledge of the unique vehicle identifier 116 are able to correctly calculate the resulting hash. If the unique vehicle identifier 116 is sufficiently long, a brute force attack against the resulting hash is not viable and an external attacker would not be able to bypass the pre-authentication. By randomizing or incrementing the challenge value, an attacker is also unable easily to replay a previous calculated hash to bypass the pre-authentication.

FIG. 5 illustrates an example portion 500 of the data flow diagram showing validation of the hash value of the pre-authentication response. More specifically, the example portion 500 illustrates two outcomes: a first data flow portion for an invalid pre-authentication response (shown as the upper data flow, and a second data flow portion for a valid pre-authentication response (shown as the lower data flow).

With respect to the invalid pre-authentication response, at index (J) if the value sent by the connecting device 402 does not match the value calculated by the vehicle 102, at index (K) the vehicle 102 may terminate the BLUETOOTH connection with the connecting device 402. As the BLUETOOTH connection is relatively less expensive in terms of energy cost as compared to a full connecting device 402 authentication, the invalid pre-authentication may be addressed without excessive resource use on the vehicle 102.

With respect to the valid pre-authentication response, at index (L) the vehicle 102 instead determines that the value sent by the connecting device 402 is a match to the value calculated by the vehicle 102 (e.g., the same result was obtained). This would be the case if the connecting device 402 has the correct unique vehicle identifier 116, and accordingly can perform the same Hash operation using the unique vehicle identifier 116 and the challenge value. As the pre-authentication is successful, at index (M) the vehicle 102 may indicate to the connecting device 402 that the pre-authentication is successful in anticipation of further authentication steps.

At index (N), the vehicle 102 initializes additional cryptographic hardware. For instance, the vehicle 102 may activate cryptographic hardware to provide for authentication support using pre-shared secret keys and a cryptographic challenge-response mechanism. In another example, the vehicle 102 may activate a hardware random number generator. At index (O), the vehicle 102 performs the high-power secondary authentication to strongly identify the connected connecting device 402.

By performing the low resource usage pre-authentication, the higher resource usage secondary authentication may be avoided for rogue connecting devices 402 unable to successfully complete the pre-authentication. Moreover, by performing the secondary authentication, security of the vehicle 102 is maintained, while battery drain risks for the vehicle 102 in performing authentications is reduced.

Figure 6:
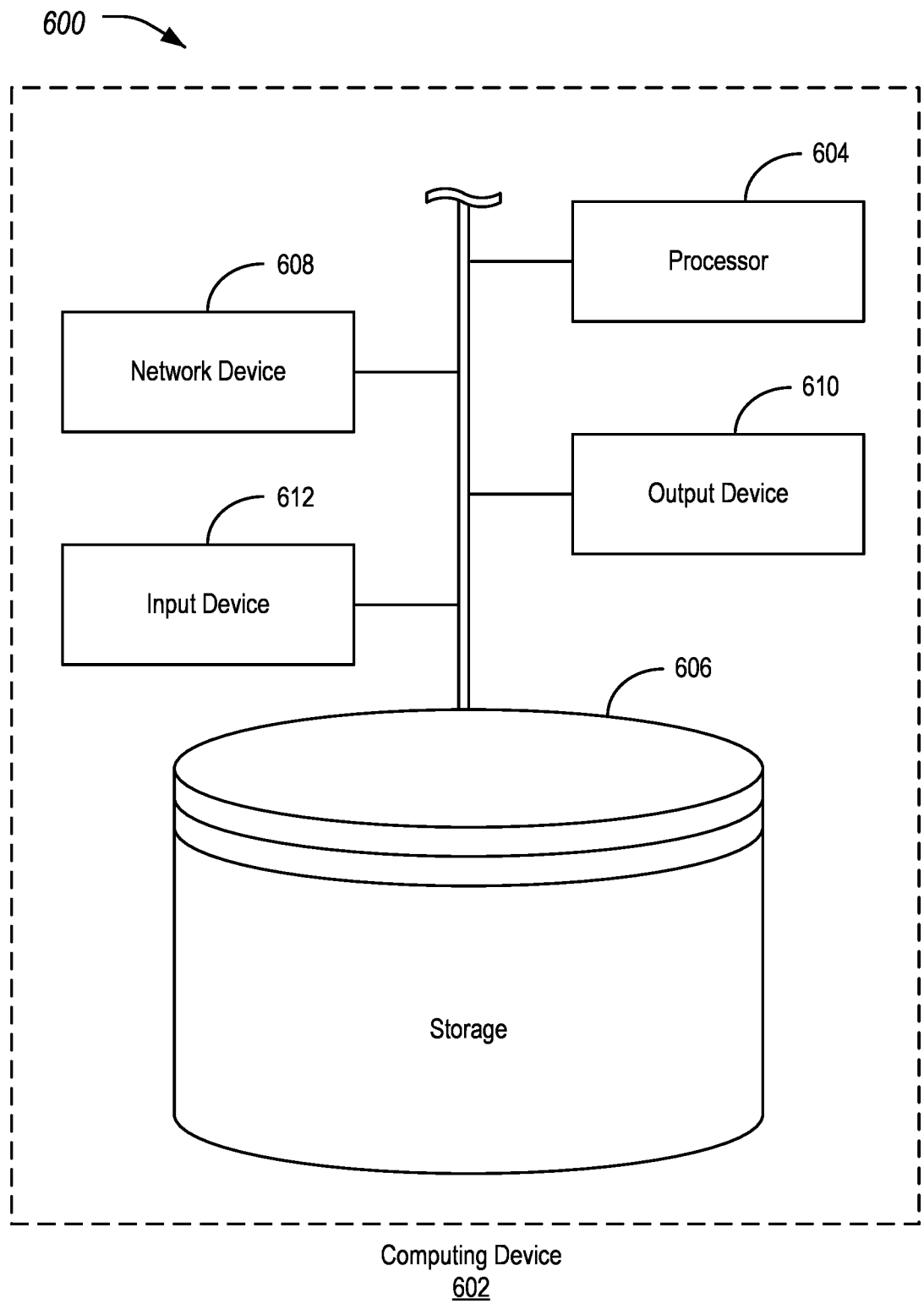
FIG. 6 illustrates an example of a computing device for the pre-authentication scheme for the detection and prevention of resource drain from unauthorized wireless device connections.

FIG. 6 illustrates an example 600 of a computing device 602 for the pre-authentication scheme for the detection and prevention of resource drain from unauthorized wireless device connections. Referring to FIG. 6, and with reference to FIGS. 1-5, the mobile device 104, BLEM 108, authentication manager 114, parking lot wireless tags 204, vehicle charging stations 302, and/or connecting devices 402 may be examples of such computing devices 602. As shown, the computing device 602 includes a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102 and/or mobile device 104 to send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for detection and prevention of resource drain from unauthorized wireless device connections comprising:
a memory configured to store a unique vehicle identifier; and
a controller of a vehicle, programmed to:
responsive to receipt of a connection request from a connecting device, send a pre-authentication message to the connecting device, the pre-authentication message including a challenge value;
compute a vehicle hash result using a hash function taking the challenge value and a unique identifier of the vehicle as inputs;
receive a device hash result from the connecting device;
responsive to a match of the vehicle hash result and the device hash result being determined by the controller without activating additional cryptographic hardware, activate the additional cryptographic hardware to perform a secondary authentication of the connecting device; and
responsive to a mismatch of the vehicle hash result and the device hash result, reject authentication of the connecting device without activation of the additional cryptographic hardware, thereby avoiding key-off load from the additional cryptographic hardware in instances where pre-authentication of the connecting device fails.

2. The system of claim 1, wherein the challenge value is a random number that is different for each connection request.

3. The system of claim 1, wherein the challenge value is a counter value that is incremented for each connection request.

4. The system of claim 1, wherein, prior to the connection request, the unique vehicle identifier is provided on a human machine interface of the vehicle for capture by the connecting device.

5. The system of claim 4, wherein the unique vehicle identifier is provided on the human machine interface as a barcode for scanning by a camera of the connecting device.

6. The system of claim 4, wherein the unique vehicle identifier is provided on the human machine interface as a numeric value.

7. The system of claim 1, wherein the hash function is a one-way cryptographic function.

8. The system of claim 1, wherein the controller is further programmed to:
generate the unique vehicle identifier; and
send the unique vehicle identifier to a remote server for distribution to the connecting device.

9. The system of claim 1, wherein the controller is further programmed to receive the unique vehicle identifier from a remote server.

10. A method for detection and prevention of resource drain from unauthorized wireless device connections comprising:
responsive to receiving a connection request to a vehicle from a connecting device, sending a pre-authentication message to the connecting device, the pre-authentication message including a challenge value;
computing a vehicle hash result using a hash function taking the challenge value and a unique identifier of the vehicle as inputs;
receiving a device hash result from the connecting device;
responsive to a match of the vehicle hash result and the device hash result being determined without activating additional cryptographic hardware, activating the additional cryptographic hardware to perform a secondary authentication of the connecting device; and responsive to a mismatch of the vehicle hash result and the device hash result, rejecting authentication of the connecting device without activation of the additional cryptographic hardware, thereby avoiding key-off load from the additional cryptographic hardware in instances where pre-authentication of the connecting device fails.

11. The method of claim 10, further comprising computing the device hash result by the connecting device, further using the hash function taking the challenge value and the unique identifier of the vehicle as inputs.

12. The method of claim 10, wherein the challenge value is a random number that is different for each connection request.

13. The method of claim 10, wherein the challenge value is a counter value that is incremented for each connection request.

14. The method of claim 10, further comprising, prior to the connection request, providing the unique identifier on a human machine interface of the vehicle for capture by the connecting device.

15. The method of claim 14, wherein the unique identifier is provided on the human machine interface as a barcode for scanning by a camera of the connecting device.

16. The method of claim 14, wherein the unique identifier is provided on the human machine interface as a numeric value.

17. The method of claim 10, wherein the hash function is a one-way cryptographic function.

18. The method of claim 10, further comprising:
generating the unique identifier by the vehicle; and
sending the unique identifier from the vehicle to a remote server for distribution by the remote server to the connecting device.

19. A non-transitory computer-readable medium comprising instructions for detection and prevention of resource drain from unauthorized wireless device connections that, when executed by a processor of a controller of a vehicle, cause the vehicle to perform operations including to:
obtain or pre-generate a unique vehicle identifier;
store the unique vehicle identifier to a memory of the vehicle;
prior to a connection request, providing the unique vehicle identifier for capture by a connecting device;
responsive to receipt of the connection request from the connecting device, send a pre-authentication message to the connecting device, the pre-authentication message including a challenge value, the challenge value being different for each connection request;
compute a vehicle hash result using a hash function taking the challenge value and a unique identifier of the vehicle as inputs;
receive a device hash result from the connecting device, the device hash result being computed by the connecting device also using the hash function taking the challenge value and the unique identifier of the vehicle as inputs;
responsive to a match of the vehicle hash result and the device hash result being determined without activating additional cryptographic hardware, activate the additional cryptographic hardware to perform a secondary authentication of the connecting device; and
responsive to a mismatch of the vehicle hash result and the device hash result, reject authentication of the connecting device without activation of the additional cryptographic hardware, thereby avoiding key-off load from the additional cryptographic hardware in instances where pre-authentication of the connecting device fails.

* * * * *